United States Patent [19]

Schilling

[11] Patent Number: 5,328,505
[45] Date of Patent: * Jul. 12, 1994

[54] CATIONIC AQUEOUS BITUMINOUS AGGREGATE SLURRIES FOR HOT CLIMATES

[75] Inventor: Peter Schilling, Charleston, S.C.

[73] Assignee: Westvaco Corporation, New York, N.Y.

[ * ] Notice: The portion of the term of this patent subsequent to Jun. 14, 2011 has been disclaimed.

[21] Appl. No.: 122,004

[22] Filed: Sep. 14, 1993

Related U.S. Application Data

[63] Continuation-in-part of Ser. No. 961,658, Oct. 16, 1992, abandoned.

[51] Int. Cl.$^5$ ............................................. C08L 95/00
[52] U.S. Cl. ..................................... 106/277; 106/278; 106/284.01; 106/284.06; 252/311.5
[58] Field of Search ........... 106/277, 278, 280, 284.01, 106/284.06; 252/311.5

[56] References Cited

U.S. PATENT DOCUMENTS

| | | | |
|---|---|---|---|
| 3,859,227 | 1/1975 | Dwyer | 252/311.5 |
| 4,017,419 | 4/1977 | Ludwig et al. | 106/277 |
| 4,170,484 | 10/1979 | Crawford et al. | 106/277 |
| 4,447,269 | 5/1984 | Schreuders et al. | 106/277 |
| 4,450,011 | 5/1984 | Schilling et al. | 106/277 |
| 4,462,840 | 7/1984 | Schilling et al. | 106/277 |
| 4,547,224 | 10/1985 | Schilling | 106/277 |
| 4,597,799 | 7/1986 | Schilling | 106/277 |
| 5,019,168 | 5/1991 | Schilling | 106/277 |
| 5,096,495 | 3/1992 | Schilling et al. | 106/277 |
| 5,160,453 | 11/1992 | Schilling | 106/277 |

Primary Examiner—Helene Klemanski
Attorney, Agent, or Firm—Terry B. McDaniel; Daniel B. Reece, IV; Richard L. Schmalz

[57] ABSTRACT

Cationic aqueous bituminous emulsion-aggregate slurries are disclosed to be formed with cationic emulsions prepared at elevated temperatures by emulsifying bitumen, such as an asphalt, in water with a cation-active emulsifier which is the blend of the reaction of a polyamine or of a modified polyamine with certain polycarboxylic acids and glycol esters. The emulsifiers are obtained by reacting suitable polyalkylene amines with lignin and maleinized lignin or their blends with tall oil fatty acids and the reaction product of $C_8$–$C_{15}$ alkylphenol with 30 to 100 moles of ethylene oxide.

10 Claims, No Drawings

CATIONIC AQUEOUS BITUMINOUS AGGREGATE SLURRIES FOR HOT CLIMATES

This application is a continuation-in-part of application Ser. No. 07/961,658 filed Oct. 16, 1992 now abandoned.

BACKGROUND OF THE INVENTION

1. Field of Invention

The present invention relates to mixing-grade quick-setting and slow-setting cationic aqueous bituminous emulsion-aggregate paving slurry seal mixtures. More particularly, this invention relates to said paving slurry seal mixtures formed with cationic emulsions prepared by emulsifying bitumen, such as an asphalt, in water with a cation-active emulsifier which is the product of the reaction of polyamines with certain polycarboxylic acids. Alternatively, this reaction product may be employed in mixing-grade, quick-setting and slow-setting cationic aqueous bituminous emulsion aggregate paving slurry seal mixtures as a set retarder wherein the emulsifier is the reaction product of a polyamine with certain polycarboxylic acids.

2. Description of the Prior Art

Conventionally, emulsion slurry seals are formulated from (1) mineral aggregate which is a fine stone aggregate and/or mineral filler and (2) about 10% to about 20% by weight thereof of a mixing-grade emulsion containing from about 50% to about 75% by weight of bituminous residue (usually asphalt), with a further addition of about 5% to about 35% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such a mixture with aggregate, the aqueous emulsion form of the bituminous material has been generally preferred because it is less hazardous and more economical to use than hot mix or cutback (solvent-containing) asphalts. Further, the aqueous emulsion form can be stored, transported, and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example from the emulsion can be controlled to some extent, the time required for complete deposition is never very long, and it is therefore the practice to combine the cationic emulsion with the aggregate at the site of road construction, either on the surface of the road itself or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently make it impossible to use such emulsions with fine-grained aggregate in slurry form such as in gun application or spreader box application. Therefore, since the slurry seal should mix well, pump well, lay down well, not stiffen while being applied, and after setting, wear well under traffic, it is particularly desirable to be able to control the setting time of the slurry for various aggregates employed.

Acidified reaction products of certain polycarboxylic acids, anhydrides, sulfonated fatty acids and epoxidized glycerides with certain polyamines are suitable emulsifiers yielding asphalt emulsions which can be mixed with the fine grained aggregate to give workable aggregate/emulsion mixes.

These emulsifiers generally are disclosed in U.S. Pat. No. 4,447,269 to Schreuders, et al., U.S. Pat. No. 4,450,011 to Schilling, et al., U.S. Pat. No. 4,547,224 to Schilling, et al., U.S. Pat. No. 4,462,890 to Schilling, et al., U.S. Pat. No. 4,464,286 to Schilling, and U.S. Pat. No. 4,597,799 to Schilling.

However, cationic emulsions produced with the known emulsifiers can only be mixed with aggregates when the temperature of the emulsion or the aggregate is below 90° F. (~32° C.) or when the aggregate surfaces are only moderately charged. In hotter climates where the temperature of the mixes may be as high as 140° F. (~60° C.) and when highly charged aggregates have to be used, these emulsions fail the mixing process.

Accordingly, an object of this invention is to provide novel types of emulsifiers which produce emulsions which can be mixed with aggregate at elevated temperatures (i.e., 90° F. (~32° C.) and above).

A further object of this invention is to provide a novel mixture of aggregate and bituminous emulsion.

A further object is to provide a mixture of the above character which is workable under a broad range of conditions.

Another object is to provide a mixture of cationic bituminous emulsion an aggregate whose setting time can be varied.

A particular object is to provide an aqueous bituminous emulsion fine-grained aggregate slurry mixture which, even at elevated temperatures, deposits at a fairly rapid rate after being applied to the surface to be treated, and is usable for a longer period of time to enable application in slurry form.

SUMMARY OF THE INVENTION

The above objectives are met in the cationic aqueous bituminous emulsion-aggregate slurries formed with cationic emulsions prepared by emulsifying bitumen, such as an asphalt, in water with a novel cation-active emulsifier which is a blend of (1) the product of the reaction of a $C_8$–$C_{15}$ alkylphenol and 15 to 100 moles ethylene oxide and (2) the product of the reaction of a polyalkylene amine or modified polyalkylene amine with kraft lignin or kraft lignin modified with maleic anhydride and, preferably, their blends with the mono- and polycarboxylic acids and anhydrides described below:

$$CH_3(CH_2)_7CH=CH(CH_2)_7COOH$$
$$CH_3(CH_2)_5CH=CHCH=CH(CH_2)_7COOH$$
$$CH_3(CH_2)_{x+3}-\underset{\underset{O}{\overset{\|}{COH}}}{\overset{}{CH}}-(CH_2)_y-\overset{O}{\overset{\|}{C}}OH$$

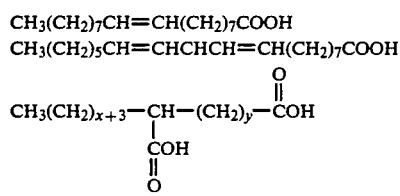

OR

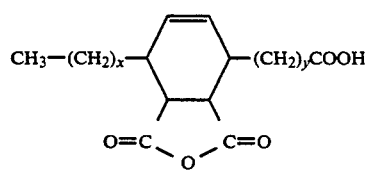

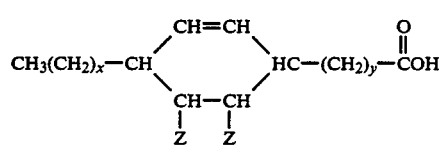

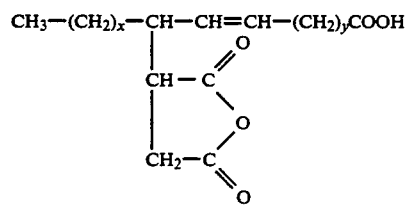

Maleinized Rosin

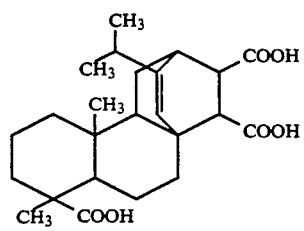

Fumarized Rosin, and

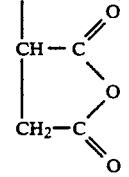

wherein x and y are integers from 3 to 9, x and y together equal 10–14, at least one Z is a carboxylic acid group and any remaining Z is hydrogen.

DESCRIPTION OF THE PREFERRED EMBODIMENTS

A typical cationic aqueous bituminous emulsion aggregate slurry is formulated in the laboratory with an amount of aggregate pre-wetted with water and mixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadside, a mobile self-propelled unit capable of uniformly metering the aggregate, water, inorganic or organic additive, and emulsion components may be used. A typical unit is equipped with separate tanks for aggregate, water, additive, and emulsion which are continually metered into a mixing chamber at a pre-determined ratio. The continually fed components are retained in the mixing chamber for approximately up to one minute and then fed into a spreader box for applying to the surface to be treated.

Batch operated pneumatic devices also can be used for suitable placement of the cationic bituminous aggregate slurries of this invention.

The slurry of this invention broadly comprises aggregate and a bituminous emulsion made up of bitumen, water, and a cationic emulsifier comprised of a mixture of a kraft lignin or maleinized kraft lignin polyamine reaction product, or their blends, with fatty acid and modified fatty acid polyamine condensates as described above in the Summary of Invention and the reaction product of a $C_8$–$C_{15}$ alkylphenol and 15–100 moles ethylene oxide.

Lignin is a complex, high-molecular weight polymer occurring naturally in close association with cellulose in plants and trees. In the paper-making industry, lignin may be recovered as a by-product of the cellulose product by two principal wood-pulping processes known as the sulfite process and the kraft process. In the sulfite pulping process, lignin is solubilized from the cellulosic portion of the wood pulp by direct sulfonation, which mechanism causes cleavage of $\beta$-aryl ether linkages in the polymeric lignin which subsequently results in chemical functions of the phenolic and carboxylic type. Kraft process lignin generally is isolated by acid precipitation from the black liquor of a kraft pulping process at a pH below the pKa of the phenolic groups.

Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is then processed by washing and acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or an ammonium salt, is soluble in water, whereas free acid lignin and polyvalent metal salts of lignin are insoluble in water.

The high degree of chemical activity which is characteristic of lignin permits the preparation of many organic derivatives.

The synthesis of lignin polyamine/formaldehyde condensation in aqueous alkaline solution has been described by Schilling et al. in U.S. Pat. No. 4,775,744 and by Hoftiezer et al., in U.S. Pat. No. 4,455,257.

In the literature, kraft lignin is described by the general formula (FIG. I) and contains the above mentioned reactive groups in the following amounts (Table I).

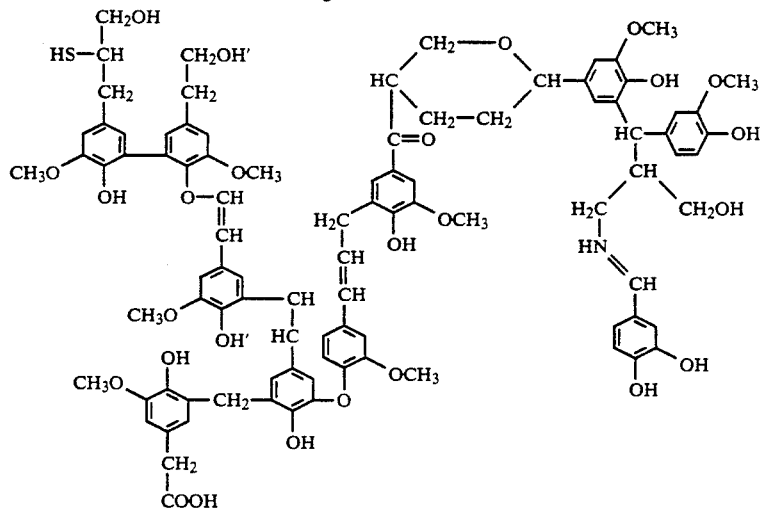

FIG I. Structure of Kraft Softwood Lignin

TABLE I

Functional Groups and Reactive Structures in Pine Kraft Lignin
(Number of groups per 1000 $C_6$-$C_3$ units)[a]

| Functional Group | Amount |
| --- | --- |
| - $OCH_3$ | 60 |
| aliphatic - OH | 48 |
| benzyl alcohol and ether ~ | 14 |
| - COOH | 16 |
| - CO (Total) | 15 |

[a] Sarkanen, K. V. and Ludwig, C. H.; "Lignins," Wiley-Interscience 1971, p. 673.

Reactivity of Lignin with Polyamines at Elevated Temperatures

Kraft lignin (INDULIN A) is dissolved in a polyamine such as diethylentriamine (DETA) or a higher linear, branched, or cyclic homologeus or in blends with ethylene glycol and diethylene glycol (to reduce viscosity) at 120°–150° C. The solution is heated further, and at 170°–220° C. lignin undergoes condensation reactions to form acid soluble lignin polyamines which are compatible with asphalt emulsifiers such as INDULIN MQK-1M, INDULIN MQK, or quebraccho amine.

Since lignin is a complex molecule, several reactions occur simultaneously when it is reacted with a polyamine at elevated temperature.

The reactive sites in lignin are:

1. Methoxyl groups: undergo demethylation via a transmethylation mechanism.

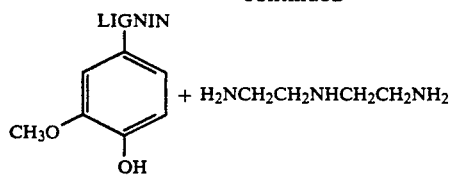

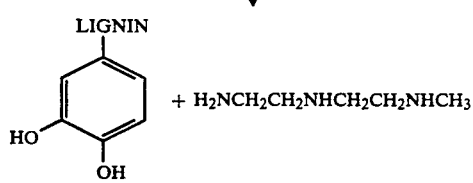

2. Ortho-quinone structures: undergo 1,6-addition of amines across the ring system.

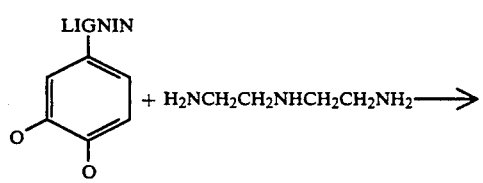

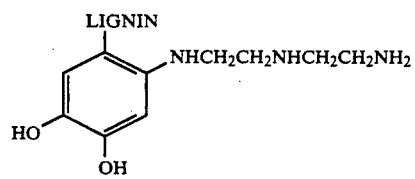

3. Aldehyde, ketone structures: form Schiff bases.

$$-\overset{H(R)}{\underset{|}{C}}-O + H_2NCH_2CH_2NHCH_2CH_2NH_2 \longrightarrow$$

$$-\overset{H(R)}{\underset{|}{C}}-NCH_2CH_2NHCH_2CH_2NH_2$$

4. α, β-Unsaturated carbonyl structures: undergo 1, 4-addition of amines, across the double bonds, and subsequently form Schiff bases.

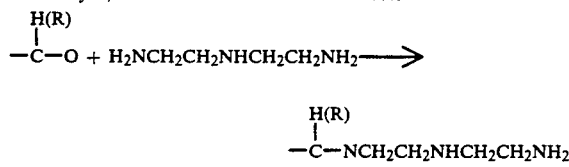

5. Carboxyl groups: form amido amines and imidazolines.

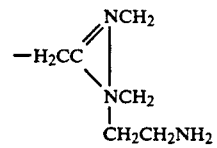

6. Benzyl alcohol or benzyl ether groups: are transformed into benzylamine groups.

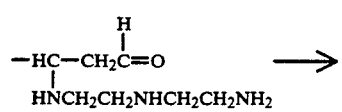

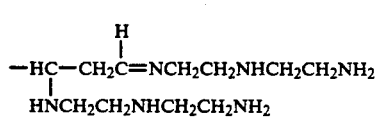

7. Reduction of molecular weight by β-ether cleavage.
8. Crosslinking of lignin molecules by polyamine.

Since lignin has only a limited number of carboxyl and carbonyl groups which will undergo condensation reaction with the amine, the following methods to increase the reactivity of lignin are feasible:

1. Introduction of additional carboxylic groups via Diels-Alder reactions with maleic anhydride.
2. Pre-condensation of the polyalkylene amine with formaldehyde resulting in amidation and Mannich aminomethylation of the lignin.
3. Pre-condensation of the polyalkylene amine with acrylic acid, fumaric acid, or maleic anhydride resulting in lignin polyaminoamidoamines.

Maleinization of Lignin

The reaction of lignin with maleic anhydride is described in the literature by Glasser, W. and Sanderman, W., in "Untersuchungen über die Umsetzung von Holz and Holzbestandteilen mit Dicarbonsäure Anhydriden, 3. Mitteilung," Svensk Papperstidning 73 (1970): 8, 246. In order to achieve a homogenous reaction mixture, however, 1–1.5 parts of maleic anhydride (MA) per 1 part of lignin has to be used. MA acts as high temperature solvent and reactant. To provide a more economical route for this reaction, lignin was dissolved in ethylene glycol, propyleneglycol, or the corresponding diglycols (at 1:1 weight ratio) at 120° C., and 5–20 parts maleic anhydride were used for fortification at 200° C.

The use of glycol solvent allows the simultaneous maleinization of blends of lignin and unsaturated fatty acid such as conjugated linoleic or resin acids occurring in tall oil. In the course of the reaction of the glycol ester derivatives of maleinized lignin (I) or lignin/fatty acid mixtures with a polyalkylene amine the corresponding aminoimido derivatives (II) are formed:

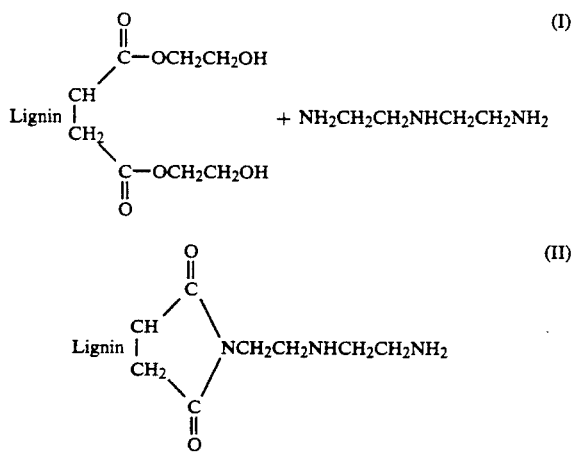

(I)

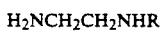

Polyamines suitable as precursors are those which are able to form imidazolines or amidoamines with carboxylic acids such as ethylene diamine, diethylene triamine, triethylene tetramine, tetraethylene pentamine, pentaethylene hexamine, and higher homologues; N-aminoethyl propane diamine, N, N'-diaminoethyl propane diamine and the N-aminoethyl- or N,N'-diaminoethyl-substituted butane diamines, pentane diamines and hexane diamines, and N-hydroxy ethylene diamine. These compounds have the general formula:

$H_2NCH_2CH_2NHR$ $R = H-, CH_3-, C_2H_5-, C_3H_7-, -CH_2CH_2OH-, -(CH_2CH_2NH)_xH$ $x = 1,2,3,4, \ldots 10$ or, $R_1R_2N(CH_2)_yNHR_1$ $R_1 = H-, CH_3-, C_2H_5-, C_3H_7-, NH_2CH_2CH_2-,$ $R_2 = H-, CH_3-, C_2H_5-,$ $y = 2,3,4,5,6.$ Amines capable of forming amidoamines but not imidazolines are: 1,3-diaminopropane, 1,4-diaminobutane, 1,5-diaminopentane, 1,6-diaminohexane, piperazine (1,4-diazacyclohexane), N-aminoethylpiperazine, N-hydroxethyl piperazine, N-aminopropyl-propane diamine-1,3, N-methyl-N-aminopropylpropane diamine-1,3, N-aminohexylhexane diamine-1,6.

In addition, polyamines containing other functionalities such as (—O—), thioether (—S—), sulfoxide (—SO—), sulfone (—SO$_2$—) groups, as well as aromatic structures are also suitable for condensation.

$R_1H_2N(CH_2)_xY(CH_2)_zNH_2$ $Y = O, S, SO, SO_2-, C_6H_4-$ $x = 2-10$ $z = 2-10$

Further modification of the above described polyalkylene amine is their reaction with formaldehyde or other suitable aldehydes to give higher molecular weight methylene crosslinked derivatives, and their reaction products with acrylic acid, methacrylic acid, fumaric acid, or maleic anhydride resulting in higher molecular weight polyamido (imido) amines. As a result of these reactions, longer polyamino amido chains are attached to the lignin or maleinized lignin, or their blends, with fatty acids or modified fatty acids.

Further modification of the lignin polyamine condensates are their reaction products with reactive oxirane systems such as ethylene oxide, propylene oxide, or butylene oxide. Reaction occurs initially on primary and secondary nitrogens, that is, a nitrogen to which one or two hydrogen atoms are covalently bound. The reaction products belong to the class of N-hydroxyethyl-, N-2-hydroxypropyl-, and N-2-hydroxybutylamino amidoamines. If excess oxirane is reacted, polyethylene oxides, polypropylene oxides, or polybutylene oxides are obtained. The hydroxyl groups also will react in this case.

Another modification may involve the use of an alkylating agent such as methyl-, ethyl-, or benzylhalides, sulfates, phosphates, etc. The resulting compounds are classified as mono-, di-, or triquaternary ammonium salts. Their main characteristic is their solubility in aqueous systems without addition of acid, as is the case with amines and amidoamines. The use of the polyamine condensation of lignin, maleinized lignin, or their blends, with tall oil derived mono-$C_{21}$-di- and $C_{22}$-tricarboxylic acid (or anhydride), rosin, maleinized-rosin, and/or fumarized rosin in combination with $C_8$-$C_{15}$ alkylphenol ethoxylates as asphalt emulsifiers, and specifically as emulsifiers for solventless asphalt emulsions and emulsions for slurry seal applications, was heretofore unknown.

The examples which follow are illustrative of emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions employed in the invention paving slurry seal mixtures, an aqueous acidic solution of the emulsifiers described below is intimately mixed under high shear in a colloid mill. The bitumen content can range from 30% to about 80% by weight of the emulsion, preferably between 60% and 70%. The dosage of emulsifier can range from 0.1-10% by weight of the emulsion, preferably between 0.5-2% by weight of the emulsion. Dependent on the emulsifier, a slurry-grade emulsion is obtained in a pH range of 1-7, with the optimum performance at a pH of about 2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cement diluted from solvents (cutback asphalts). Practically any viscosity or penetration graded asphalt cement for use in pavement construction as described in ASTM designation D-3381 and D-946 may be emulsified with the aid of the emulsifiers of the invention.

The cationic soap solutions normally are obtained by suspending the amidoamine or imidazoline in water to which a sufficient amount of a suitable acid, such as hydrochloric or phosphoric acid, or the like, is added until the desired pH value below 7 is reached, and a clear emulsifier solution is obtained. Thereafter, the soap solution which is preheated to 55° C. and the fluid asphalt which is preheated to 120°-125° C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement, hydrated lime, limestone dust, and/or fly ash, may be added to accelerate set/break time and organic salts, such as ammonium sulfate, or emulsifiers may be added to retard the set/break of the slurry system. Such additives shall comply with the requirements of ASTM D-242. The materials are mixed in a mixing bowl until a homogeneous slurry mixture is obtained. The ability to form a stable slurry within 2 to 3 minutes of mixing time when proper proportions of each ingredient are used would indicate a mixture in which the materials are compatible. This mix design is necessary to simulate field conditions. After the slurry is mixed, it is spread in a mold which is placed on an asphalt felt, and the set-/break time is measured by blotting the exposed slurry surface with a paper towel. If no brown stain is transferred to the paper, the slurry is considered to be "set." The cure time could also be measured with a cohesion testing device. Many other tests, such as described in ASTM D-3910, are used to measure strength and other physical properties of slurry. *The Performance Guide for Slurry Seal* published by the Asphalt Emulsion Manufacturers Association is used to measure the performance of the slurry seal.

The emulsion should be stable during mixing and should set within the designated time period following application. The emulsifiers of this invention perform very satisfactorily without auxiliary emulsifiers. For instance, the setting times can be controlled with the concentration of emulsifier, the addition of lime, cement, or other inorganic additive or an organic additive, which would alter the break characteristics of the slurry system. An organic additive-polymer latex also may be employed to strengthen the matrix. The organic additive preferably is added to the emulsion-aggregate slurry.

A mixture of tall oil fatty acids, preferably tall oil pitch, can be added to the bitumen (asphalt) prior to emulsification to improve break or to improve the viscosity of the emulsion. Alternatively, blends of the above described amidoamines with compatible cationic or nonionic emulsifiers may be used for the emulsification of the bitumen.

The practice of this invention may be seen in the following examples wherein the preparation of various types of emulsifiers and types of slurries of the invention is described.

EXAMPLE 1

Preparation of Emulsifiers A. General preparation of lignin polyamidoamines

Without Glycol: One hundred grams of a blend mainly consisting of aminoethylpiperazine and triethylene tetramine is heated to 120° C. and 100 g dry INDULIN A powder is added slowly thereto in increments of 10 g, with agitation, to ensure a uniform solution of the lignin in the amine. The reaction mixture is heated slowly to 230° C. and kept at this temperature for 30 minutes until all the reaction water is removed. It is cooled to 200° C. and discharged into a metal container. There it may be solidified at room temperature, or 150 grams ethylene glycol are added thereto and cooled further to 130° C. at which point water is added to a final solids content of 50%, by weight.

With Glycols: One hundred grams of diethyleneglycol is heated to 150° C., and 100 g dry lignin powder (INDULIN A) is slowly added in increments of 10 g, with agitation, to ensure uniform solution of the lignin in diethylene glycol. After 30 minutes (when most of the water formed by esterification of the lignin was removed), 100 g of the polyamine blend was added; and, heating to 220° C., additional reaction water was formed. After all the reaction water was removed, the lignin amidoamine/glycol solution was cooled to 120° C. where water was added to a final lignin amidoamine concentration of 50%, by weight.

B. General Preparation of Polyamine Condensates of Maleinized Lignin

A solution of 100 g lignin in 100 g ethylene glycol was prepared at 120° C., as described above. Slowly, 5 to 20 grams powdered maleic anhydride was added, and the mixture was heated to 200° C. and kept at this temperature for 3 hours. The water formed as result of esterification was removed. Then 100 g of the polyamine blend described above was added slowly and the reaction mixture kept at 200° C. for one hour, after which it was cooled to 120° C. Water was added to adjust the final lignin amidoamine concentration to 50%, by weight.

C. Modification with Formaldehyde

Precondensation of Polyamine with Formaldehyde

To 100 g of the polyamine blend described above 2 to 10 g paraformaldehyde or 5 to 30 g of a 37% formalin solution was added at room temperature and slowly heated to 150° C. At this temperature 100 g lignin was added in increments of 10 g and then slowly heated to 230° C. where the reaction mixture was kept until all the water of reaction was collected. It was cooled to 200° C. and discharged without dilution. Discharge may occur after diluting with ethylene glycol and water.

Postreaction of the Lignin Amidoamine with Formaldehyde

The lignin amidoamine or the amidoamine condensate of maleinized lignin was prepared as described above. Either formalin solution or paraformaldehyde was added after the polymeric amidoamines were diluted with ethylene glycol or diethylene glycol, and the solution was cooled to 130° C. After 30 minutes, water was added for the final solids adjustment to 50%, by weight. D. Reaction of Lignin with Polyalkylene Amine Acrylic Acid Condensate To 150 g of the blend of polyalkylene amines described above 10 to 20 g of acrylic acid was added dropwise and heated to 150° C. After all the water of reaction was removed, 150 g dry lignin powder (INDULIN A) was added in increments of 10 g and slowly heated to 240° C., which reaction temperature was maintained for 30 minutes. The reaction mixture was cooled to 210° C., 100 g ethylene glycol was added, thereto, and then it was cooled further to 120° C. Water was added to adjust to a solids level of 50%, by weight.

E. Co-Amidation of Maleinized Lignin with Fatty Acid

Blends of lignin and $C_8$–$C_{22}$ unsaturated carboxylic acid are prepared at 150° C. in enough ethylene glycol to ensure a complete and homogenous solution of hydrophilic lignin and hydrophobic fatty acid. After addition of the desired level of maleic anhydride, it is heated to 200° C. and kept at this temperature for 3 hours. Then the desired amount of the blend of polyalkylene amines described above is added and heated at 200° C. for 1 hour. It is cooled and diluted with more ethylene glycol or ethylene glycol/water mixture before the amidoamine-imidoamine blend is discharged.

F. Formulation of the Emulsifier

Ethyleneglycol or diethyleneglycol/water solutions of the above described condensation products of (1) kraft lignin or maleinized kraft lignin, and their blends with fatty acids or (2) maleinized lignin blended with fatty acids or (3) maleinized fatty acid with polyalkylene amines are mixed with ethylene glycol/water solutions of nonylphenol ethoxylate at 130° F. at amidoamine to nonylphenol ethoxylate ratios of 90:10 to 10:90. The water/glycol ratio and the level of total solids is adjusted to ensure that the emulsifier formulation is homogenous and low in viscosity.

EXAMPLE 2

A cationic aqueous bituminous emulsion was prepared employing each of the emulsifiers of Example 1 and aggregate mixing tests were performed with each emulsion as previously noted.

First, cationic emulsions were prepared with either 62–64% EXXON ® asphalt, 1.0–1.5% emulsifier at pH 2.0–2.5 (adjusted with hydrochloric acid), and water to make up 100% (percentages based on the weight of the emulsion). Next, slurries were prepared by adding 100 g of Camak (Georgia) granite screenings, 14% of the cationic aqueous bituminous emulsion, 12% water, and either 0% or 1–2% cement or hydrated lime as mixing aid (percentages based on the weight of the aggregate).

The mixing experiments were carried out by keeping the temperature of the emulsion, water, and aggregate at 100° F. and 70° F. (cold), respectively, as indicated in Table II.

This example illustrates the improved high temperature mixing performance and coating ability of emulsions prepared with lignin condensates as compared with commercial cationic slurry seal emulsifiers.

The slurry set times were determined by the test procedures previously described, i.e., by blotting with a paper towel the exposed surface of the slurry spread in mold on an asphalt felt. If no brown stain is transferred to the paper, the slurry is considered set. Cohesive strength development was determined on a cohesimeter.

Table II shows the improved high temperature mixing performance of aqueous bituminous emulsions prepared with the invention emulsifiers.

TABLE II

| | Mixing Performance of Slurry Seal Emulsions[a] | | | | |
|---|---|---|---|---|---|
| Emulsifier | % Dosage | Mixing Temp. | Mixing Conditions[b] | Flow Behavior[c] | Set Time (min) |
| INDULIN A- | 1.0 | 70° F. | 12W 12E | FE | 60+ |
| Amine Blend[f] | | 100° F. | 12W 12E | FE | 60+ |
| EG[d]-NP 50[e] | | 70° F. | 2C 10W 12E | FE | 60+ |
| (1:1) | | 100° F. | 2C 10W 12E | FE | 30 |
| | | 70° F. | 1L 12W 12E | FE | 60+ |
| | | 100° F. | 1L 12W 12E | FG | 60+ |
| INDULIN A- | 1.25 | 70° F. | 12W 12E | FE | 60+ |
| Amine Blend[f] | | 100° F. | 12W 12E | FE | 60+ |
| EG[d]-NP 50[e] | | 70° F. | 2C 10W 12E | FE | 60+ |
| (1:1) | | 100° F. | 2C 10W 12E | FE | 30 |
| | | 70° F. | 1L 12W 12E | FE | 60+ |
| | | 100° F. | 1L 12W 12E | FG | 60+ |
| INDULIN A- | 1.5 | 70° F. | 12W 12E | FE | 60+ |
| Amine Blend[f] | | 100° F. | 12W 12E | FE | 60+ |
| EG[d]-NP 50[e] | | 70° F. | 2C 10W 12E | FE | 60+ |
| (1:1) | | 100° F. | 2C 10W 12E | FE | 60 |
| | | 70° F. | 1L 12W 12E | FE | 60+ |
| | | 100° F. | 1L 12W 12E | FG | 60+ |
| INDULIN MQK | 1.25 | 70° F. | 12W 12E | broke in 10 sec. | |
| | | 100° F. | 12W 12E | broke in 5 sec. | |
| | | 70° F. | 2C 10W 12E | FE | 5 |
| | | 100° F. | 2C 10W 12E | FP | 30 |
| | | 70° F. | 1L 12W 12E | FP | 5 |
| | | 100° F. | 1L 12W 12E | broke in 10 sec. | |
| INDULIN MQK-1M | 1.25 | 70° F. | 12W 12E | broke in 20 sec. | |
| | | 100° F. | 12W 12E | broke in 5 sec. | |
| | | 70° F. | 2C 10W 12E | FE | 10 |
| | | 100° F. | 2C 10W 12E | broke in 20 sec. | |
| | | 70° F. | 1L 12W 12E | FE | 10 |
| | | 100° F. | 1L 12W 12E | broke in 5 sec. | |

[a]EXXON 120/150 penetration asphalt was emulsified at 64% asphalt content and pH 1.5; granite (Camak) was used as aggregate.
[b]W: water, E: emulsion, C: cement, L: hydrated lime (percent based on the weight of the aggregate).
[c]FE: flow excellent, FG: flow good, FP: flow poor.
[d]EG: ethyleneglycol.
[e]NP-50: nonylphenol ethoxylate (50 moles ethylene oxide).
[f]Blend mainly consisting of aminoethyl piperazine and triethylene tetramine.

Table III shows the curing times of slurry seal containing 2% cement or no additive. The cohesive strength development at 100° F. is similar to that of slurry seal containing emulsions prepared with commercial emulsifiers. At 85° F. the curing times are longer.

TABLE III

CURING TIMES OF SLURRY SEAL SPECIMEN AT VARIOUS TEMPERATURES[a]

| Emulsifier | % Dosage | Curing Temperature | Mixing Conditions[b] | Cohesive Strength After[c] (min) 15 | 30 | 60 | 90 |
|---|---|---|---|---|---|---|---|
| INDULIN A-Amine | 1.25 | 70° F. | 12W 12E | 9.8 | 9.2 | 9.3 | 9.7 |
| Blend[f]-EG[d] (1:1:1)- | | 85° F. | 12E 12E | 9.7 | 9.1 | 9.5 | 11.0 |
| NP-50[e] (1:1) | | 100° F. | 12E 12E | 9.8 | 12.1 | HP | HP |
| INDULIN A-Amine | 1.0 | 70° F. | 2C 10W 12E | 8.2 | 8.8 | 10.3 | 8.6 |
| Blend[f]-EG[d] (1:1:1)- | | 85° F. | 2C 10W 12E | 8.0 | 9.1 | 9.2 | 11.5 |
| NP-50[e] (1:1) | | 100° F. | 2C 10W 12E | 10.6 | HP | HP | HP |
| INDULIN A-Amine | 1.25 | 70° F. | 2C 10W 12E | 8.3 | 8.2 | 9.5 | 9.1 |
| Blend[f]-EG[d] (1:1:1)- | | 85° F. | 2C 10W 12E | 9.6 | 8.8 | 10.0 | 11.9 |
| NP-50[e] (1:1) | | 100° F. | 2C 10W 12E | 9.8 | HP | HP | HP |
| INDULIN A-Amine | 1.5 | 70° F. | 2C 10W 12E | 8.7. | 8.9 | 8.8 | 9.2 |
| Blend[f]-EG[d] (1:1:1)- | | 85° F. | 2C 10W 12E | 8.5 | 9.3 | 10.0 | 10.6 |
| NP-50[e] (1:1) | | 100° F. | 2C 10W 12E | 8.8 | 13.6 | HP | HP |
| INDULIN - MQK-1M | 1.25 | 70° F. | 2C 12W 12E | 10.5 | 10.5 | 12.1 | 14.2 |
| | | 85° F. | 2C 12W 12E | 12.9 | 13.6 | 13.3 | HP |
| | | 100° F. | 2C 12W 12E | 13.3 | HP | HP | HP |
| INDULIN - MQK | 1.25 | 70° F. | 2C 12W 12E | 10.6 | 12.7 | 12.9 | 14.2 |
| | | 85° F. | 2C 12W 12E | 13.1 | 14.4 | 15.0 | HP |
| | | 100° F. | 2C 12W 12E | 11.1 | 15.3 | HP | HP |

[a]The mixes were carried out at room temperature; granite (Camak) was used as aggregate.
[b]W: water, E: emulsion, C: cement (percent based on the weight of the aggregate)
[c]HP: hydroplaning; mixes have cohesive strength of at least 20 psi.
[d]EG: Ethylene glycol.
[e]NP-50: Nonylphenol ethoyxlate (50 moles ethylene oxide).
[f]Blend mainly consisting of aminoethyl piperazine and triethylene tetramine.

Table IV shows the improved aggregate coating with the invention emulsions determined by the boiling test in water. Emulsions prepared with amine condensates of maleinized lignin and maleinized lignin/tall oil fatty acid or maleinized lignin/tall oil rosin blends give improved coating. After 10 min. in boiling water 95–100% of the aggregate surface is coated by asphalt. The test specimen had high cohesive integrity and did not fall apart as result of the boiling test. Emulsions prepared with commercial emulsifiers and the same aggregate give test specimen which do not stay intact when boiled in water.

TABLE IV

EVALUATION OF AMINE CONDENSATES PREPARED FROM MALEINIZED LIGNIN OR LIGNIN/FATTY ACID (ROSIN) BLENDS[a]

| Emulsifier | Mixing Temperature | Mixing[b] Conditions | Flow Behavior | Set Time (min) | Cement Mixing Test | Ductility[d] (cm) | Particle Charge Test[e] (mv in 30 min.) | % Coating[f] |
|---|---|---|---|---|---|---|---|---|
| INDULIN A-Amine | RT | 12W 12E | FE | 60+ | passed | 130 | 8.0/30 | 80 DNFA |
| Blend[g]-EG[h] | RT | 2C 10W 12E | FE | 60+ | | | | 90 DNFA |
| (1:1:1)-NP-50[k] | 100° F. | 1C 12W 12E | FE | 60+ | | | | 80 DNFA |
| (1:1) | 100° F. | 2C 12W 12E | FE | 60+ | | | | 95 DNFA |
| INDULIN A-MA[j] | RT | 10W 12E | FE | 60+ | passed | 107 | 8.0/30 | 95 DNFA |
| Amine Blend[g]-EG[h] | RT | 2C 10W 12E | FE | 60+ | | | | 95 DNFA |
| (100:5:100:100)- | 100° F. | 1C 12W 12E | FE | 60+ | | | | 80 DNFA |
| NP-50[k] (1:1) | 100° F. | 2C 12W 12E | FE | 60+ | | | | 95 DNFA |
| INDULIN A-MA[j]- | RT | 12W 12E | FE | 60+ | passed | 127 | 8.0/30 | 100 DNFA |
| Blend-EG[h] | 100° F. | 2C 12W 12E | broke in 60 sec. | | | | | 95 DNFA |
| (100:5:100:100)- | | | | | | | | |
| NP-50[k] (0.7:0.3) | | | | | | | | |
| INDULIN A-MA[j] | RT | 10W 12E | FE | 60+ | passed | 90 | 8.0/30 | 95 DNFA |
| Amine Blend[g]-EG[h] | RT | 2C 10W 12E | FE | 60+ | | | | 95 DNFA |
| (100:10:100:100)- | 100° F. | 1C 12W 12E | FE | 60+ | | | | 90 DNFA |
| NP-50[k] (1:1) | 100° F. | 2C 11W 12E | FE | 60+ | | | | 98 DNFA |
| INDULIN A-MA[j] | RT | 11W 12E | FE | 60+ | passed | 101 | 8.0/30 | 95 DNFA |
| Amine Blend[g]-EG[h] | RT | 2C 10W 12E | FE | 60+ | | | | 95 DNFA |
| (100:20:100:100)- | 100° F. | 1C 12W 12E | FE | 60+ | | | | 80 DNFA |
| NP-50[k] (1:1) | 100° F. | 2C 11W 12E | FE | 60+ | | | | 98 DNFA |
| INDULIN A-L-5[j] | RT | 11W 12E | broke in 5 sec. | | passed | 130+ | 6.9/30 | |
| MA[j]-Amine Blend[g]-EG[h] | RT | 2C 12W 12E | FE | 60+ | | | | 85 DNFA |
| (50:50:20:100:100)- | 100° F. | 1C 12W 12E | FE | 60+ | | | | 95 DNFA |
| NP-50[k] (1:1) | 100° F. | 1C 12W 12E | FE | 60+ | | | | 80 DNFA |
| INDULIN A-L-5[j]- | RT | 12W 12E | broke in 60 sec. | | passed | 130+ | 8.0/30 | 100 DNFA |
| MA[j]-Amine Blend[g]- | 100° F. | 2C 12W 12E | FE | 60+ | | | | 95 DNFA |
| EG[j] (75:75:30:150:150)- | | | | | | | | |
| NP-50[k] (1:1) | | | | | | | | |
| INDULIN A-L-5[j]- | RT | 12W 12E | broke in 60 sec. | | passed | 130+ | 8.0/30 | 100 DNFA |
| MA[j]-Amine Blend[g] | 100° F. | 2C 12W 12E | FE | 60+ | | | | 95 DNFA |
| EG[j] (75:75:45:195:150)- | | | | | | | | |
| NP-50[k] (1:1) | | | | | | | | |
| INDULIN A-Rosin S- | RT | 11W 12E | FE | 60+ | passed | 112 | 7.8/30 | 100 DNFA |
| Amine Blend[g]-EG[h] | RT | 2C 10W 12E | FE | 60+ | | | | 95 DNFA |
| (50:50:20:100:100)- | 100° F. | 1C 12W 12E | FE | 60+ | | | | 90 DNFA |
| NP-50[k] (1:1) | 100° F. | 2C 12W 12E | FE | 60+ | | | | 98 DNFA |
| INDULIN A-Rosin S- | RT | 12W 12E | FE | 60+ | passed | 108 | 8.0/30 | 100 DNFA |

TABLE IV-continued

EVALUATION OF AMINE CONDENSATES PREPARED FROM
MALEINIZED LIGNIN OR LIGNIN/FATTY ACID (ROSIN) BLENDS[a]

| Emulsifier | Mixing Temperature | Mixing[b] Conditions | Flow Behavior | Set Time (min) | Cement Mixing Test | Ductility[d] (cm) | Particle Charge Test[e] (mv in 30 min.) | % Coating[f] |
|---|---|---|---|---|---|---|---|---|
| Amine Blend[g]-EG[h] (50:50:20:100:100)- NP-50[k] (0.7:0.3) | 100° F. | 2C 12W 12E | FE | 60+ | | | | 95 DNFA |

[a]EXXON ® 120/150 penetration asphalt, 64% asphalt content, 1.25% emulsifier, pH 2.5.
[b]W: water, E: emulsion, C: cement; percent based on the weight of the aggregate; Camak (granite) aggregate was used.
[c]FE: flow excellent.
[d]Determined at 77° F.
[e]Millivolts reached after 30 min.
[f]% coating retained after boiling in water for 10 min., DNFA: test specimen did not fall apart.
[g]Blend consisting mainly of aminoethyl piperazine and triethylene tetramine.
[h]EG: Ethyleneglycol
[i]MA: Maleic anhydride
[j]L-5: Tall oil fatty acid
[k]NP-50: Nonylphenol ethoxylate (50 moles ethylene oxide)

Table V shows the excellent aggregate coating performance of emulsions prepared with these emulsifiers.

EXAMPLE 3

This example shows the use of the amine condensates of Example 1 as set retarders and aggregate mixing aids for emulsions prepared with conventional slurry seal emulsifiers. In this case, the proper amounts of acidified (pH 2), diluted solutions (1%) of the lignin amidoamines are added to the mixing water of the slurry seal formulation before addition of the bituminous emulsions. Table VI shows the improved mixing performance of emulsions prepared with Edgington oil ® AC-20 asphalt and INDULIN MQK or INDULIN MQK-1M bituminous emulsifiers at 1.25% dosage. These emulsifiers are described in U.S. Pat. Nos. 4,447,269, 4,464,285, and 4,464,286.

TABLE V

EVALUATION OF EMULSIFIERS PREPARED FROM LIGNIN AND AMINE BLEND/FORMALDEHYDE- AND AMINE BLEND/ACRYLIC ACID PRE-CONDENSATES[a]

| Emulsifier | Mixing Temperature | Mixing[b] Conditions | Flow Behavior | Set Time (min) | Cement Mixing Test | Ductility[d] (cm) | Particle Charge Test[e] (mv in 30 min.) | % Coating[f] |
|---|---|---|---|---|---|---|---|---|
| INDULIN A-Amine Blend[j]-FA[g]—EG[h] (150:150:100)/ NP-50[k] (50:50) | RT 100° F. | 12W 12E 2C 12W 12E | FE FE | 60+ 60+ | passed | 95 | 8.0/30 | 90 DNF 95 DNF |
| INDULIN A-Amine Blend[j]-FA[g]—EG[h] (150:150:10:100)/ NP-50[k] (50:50) | RT 100° F. | 12W 12E 2C 12W 12E | FE FE | 60+ 60+ | passed | 95 | 8.0/30 | 95 DNF 95 DNF |
| INDULIN A-Amine Blend[j]-ACA[i]—EG[h] (150:150:10:100/ NP-50[k] (50:50) | RT 100° F. | 12W 12E 2C 12W 12E | FE FE | 60+ 60+ | passed | 87 | 8.0/30 | 100 DNF 95 DNF |
| INDULIN A-Amine Blend[j]-ACA[i]—EG[h] (150:150:10:100)/ NP-50[k] (50:50) | RT 100° F. | 12W 12E 2C 12W 12E | FE FE | 60+ 60+ | passed | 130+ | 8.0/30 | 100 DNF 95 DNF |

[a]EXXON ® 120/150 penetration asphalt, 64% asphalt content, 1.25% emulsifier, pH 2.5.
[b]W: water, E: emulsion, C: cement; Percent based on the weight of the aggregate; Camak (granite) aggregate was used.
[c]FE: flow excellent.
[d]Determined at 77° F.
[e]Millivolts reached after 30 min.
[f]% coating retained after boiling in water for 10 min., DNF: test specimen did not fall apart.
[g]FA: paraformaldehyde.
[h]EG: ethyleneglycol.
[i]ACA: acrylic acid.
[j]Blend consisting mainly of aminoethyl piperazine and triethylene tetramine.
[k]Nonylphenol ethoxylate (50 moles ethylene oxide).

TABLE VI

EVALUATION OF LIGNIN AMINE CONDENSATES AS MIXING AIDS[a]

| Emulsifier | Mixing Additive | % Dosage[b] | Temperature (°F.) | Mixing Time (sec.)[c] | Inorganic Additive[d] |
|---|---|---|---|---|---|
| INDULIN MQK-1M | — | — | 80 | 15 | 0 |
| INDULIN MQK-1M | INDULIN A-MA[e]- Amine Blend[f]- EG[g] (100:5.5:100:100) | 0.03 | 80 | 120 | 0 |
| INDULIN MQK-1M | INDULIN A-MA[e]- Amine Blend[f]- EG[g] (100:5.5:100:100) | 0.05 | 80 | >180 | 0 |
| INDULIN MQK-1M | — | — | 100 | <10 | 1C |

TABLE VI-continued
EVALUATION OF LIGNIN AMINE CONDENSATES AS MIXING AIDS[a]

| Emulsifier | Mixing Additive | % Dosage[b] | Temperature (°F.) | Mixing Time (sec.)[c] | Inorganic Additive[d] |
|---|---|---|---|---|---|
| INDULIN MQK-1M | INDULIN A-MA[e]-Amine Blend[f]-EG[g] (100:5.5:100:100) | 0.05 | 100 | 25 | 1C |
| INDULIN MQK-1M | INDULIN A-MA[e]-Amine Blend[f]-EG[g] (100:5.5:100:100) /NP-50[h] (1:1) | 0.05 | 100 | 125 | 1C |
| INDULIN MQK | — | — | 100 | 65 | 1C |
| INDULIN MQK | INDULIN A-MA[e]-Amine Blend[f]-EG[g] (100:5.5:100:100) /NP-50[h] (1:1) | 0.05 | 100 | >180 | 1C |
| INDULIN MQK | — | — | 120 | <10 | 1C |
| INDULIN MQK | INDULIN A-Amine Blend[f]-FA[i]—EG[g] (100:100:6:100) /NP-50[h] (1:1) | 0.10 | 120 | 85 | 1C |

[a]Edgington Oil ® AC-20 asphalt, 63% asphalt content, 1.25% emulsifier, pH 2.0.
[b]Based on the weight of the aggregate.
[c]Aggregate (Camak) and emulsions were mixed until the mix broke.
[d]C: cement, percent based on the weight of the aggregate.
[e]MA: maleic anhydride
[f]Blend consisting mainly of aminoethyl piperazine and triethylene tetramine.
[g]EG: ethylene glycol
[h]NP-50: Nonylphenol ethoxylate (50 moles ethylene oxide)
[i]FA: formaldehyde

What is claimed is:

1. An improved paving slurry seal mixture of a cationic aqueous bituminous emulsion and mineral aggregate capable of being worked comprising a mineral aggregate of a grade passing through a No. 4 seive and at least 80% retained on 200 mesh, mixing water, and from about 10% to about 20%, by weight of the aggregate, of an oil-in-water emulsion of a pH of 1–7 and comprised of from about 30% to about 80% bitumen, by weight of the emulsion, from about 0.1% to about 10% of a cation active emulsifier, based on the weight of the emulsion, and water to make up 100% of the emulsion, wherein the improvement comprises, as the cation active emulsifier, a blend of (1) the product of the reaction of a $C_8$–$C_{15}$ alkylphenol with from 15 to 100 moles ethylene oxide and (2) the condensate product of the reaction of a polyamine with a member of the group consisting of kraft lignin and maleinized kraft lignin.

2. The improved paving slurry seal mixture of claim 1 wherein the lignin polyamine condensate is further blended with fatty and rosin acids selected from the group consisting of the following mono- and polycarboxylic acids and anhydrides:

$$CH_3(CH_2)_7CH=CH(CH_2)_7COOH$$
$$CH_3(CH_2)_5CH=CHCH=CH(CH_2)_7COOH$$

$$CH_3(CH_2)_{x+3}-\underset{\underset{O}{\overset{\|}{COH}}}{CH}-(CH_2)_y-\overset{O}{\overset{\|}{C}}OH$$

[cyclohexene ring structure with maleic anhydride]
$$CH_3-(CH_2)_x-\text{(cyclohexene)}-(CH_2)_yCOOH$$
with O=C–O–C=O bridge

OR

[cyclohexadiene structure]
$$CH_3(CH_2)_x-CH\underset{CH-CH}{\overset{CH=CH}{\diagup\diagdown}}HC-(CH_2)_y-\overset{O}{\overset{\|}{C}}OH$$
with Z substituents $$CH_3-(CH_2)_x-CH-CH=CH-(CH_2)_yCOOH$$
with attached succinic anhydride group (CH–C(=O)–O–C(=O)–CH_2)

[Rosin tricyclic structure with CH_3 groups and COOH]

Maleinized Rosin
$$CH_3-(CH_2)_x-CH=CH-(CH_2)_yCOOH$$
with attached succinic anhydride group (CH–C(=O)–O–C(=O)–CH_2)

-continued

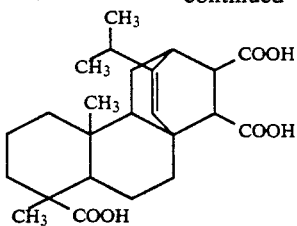

Fumarized Rosin, and

CH$_3$—(CH$_2$)$_x$—CH=CH—CH—CH=(CH$_2$)$_y$COOH

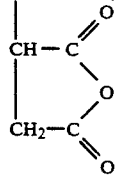

wherein x and y are integers from 3 to 9, x and y together equal 10–14, at least one Z is a carboxylic acid group and any remaining Z is hydrogen.

3. The improved paving slurry seal mixture of claim 1 wherein the mixture is cured at a temperature of from about 90° F. to about 140° F.

4. The improved paving slurry seal mixture of claim 1 wherein the polyamine is defined by the general formula selected from the group consisting of H$_2$NCH$_2$CH$_2$NHR, where $R$=H—, CH$_3$—, C$_2$H$_5$—, C$_3$H$_7$—, —CH$_2$CH$_2$OH, —(CH$_2$CH$_2$NH)$_x$H $x$=1, 2, 3, 4, ... 10, R$_1$R$_2$N(CH$_2$)$_y$NHR$_1$, where $R_1$=H—, CH$_3$—, C$_2$H$_5$—, C$_3$H$_7$—, NH$_2$CH$_2$CH$_2$—

$R_2$=H—, CH$_3$—, C$_2$H$_5$—

$y$=2, 3, 4, 5, 6, and

R$_1$H$_2$N(CH$_2$)$_x$Y(CH$_2$)$_z$NH$_2$, where $Y$=O, S, SO, SO$_2$—, C$_6$H$_4$—

$x$=2–10

$z$=2–10.

5. The improved paving slurry seal mixture of claim 1 wherein the polyamine is selected from the group consisting of 1,3-diaminopropane, 1,4-diaminobutane, 1,5-diaminopentane, 1,6-diaminohexane, piperazine, N-aminoethyl piperazine, N-hydroxyethyl piperazine, N-aminopropyl-propane diamine-1,3, N-methyl-N-aminopropylpropane diamine-1,3 and N-aminohexyl-hexane diamine-1,6.

6. The improved paving slurry seal mixture of claim 1 wherein the polyamine is modified by reaction with an aldehyde followed by reaction with a member of the group consisting of acrylic acid, methacrylic acid, fumaric acid, and maleic anhydride.

7. The improved paving slurry seal mixture of claim 1 wherein the lignin polyamine condensate is modified by reaction with a member of the group consisting of ethylene oxide, propylene oxide, and butylene oxide.

8. The improved paving slurry seal mixture of claim 2 wherein the kraft lignin is maleinized after blending with the fatty and resin acids.

9. The improved paving slurry seal mixture of claim 1 wherein the bitumen content of the emulsion is from about 60% to about 70%, by weight, and the emulsifier content of the emulsion is from about 0.5% to about 2%, by weight, and the emulsion pH is 2.5.

10. The improved paving slurry seal mixture of claim 1 wherein the polyamide is modified by reaction with a member of the group consisting of acrylic acid, methacrylic acid, fumaric acid, and maleic anhydride.

* * * * *